United States Patent

Knapp et al.

[11] 3,972,189
[45] Aug. 3, 1976

[54] CONTROL FOR HYDROSTATIC TRANSMISSIONS

[75] Inventors: Kenneth K. Knapp; Charles R. Cornell; Edwin D. Hicks, all of Battle Creek, Mich.

[73] Assignee: Eaton Corporation, Cleveland, Ohio

[22] Filed: Nov. 17, 1975

[21] Appl. No.: 632,741

[52] U.S. Cl. .................................. 60/444; 60/464;
  60/465; 60/487; 91/420; 91/459; 60/403
[51] Int. Cl.² ........................................ F16H 39/46
[58] Field of Search ............ 91/420, 427, 459, 462, 91/465; 60/464, 465, 487, 488, 443, 444

[56] References Cited
UNITED STATES PATENTS

| | | | |
|---|---|---|---|
| 2,918,042 | 12/1959 | Jensen et al. | 91/459 |
| 3,359,727 | 12/1967 | Hann et al. | 60/465 X |
| 3,901,031 | 8/1975 | Knapp et al. | 60/395 |

*Primary Examiner*—Edgar W. Geoghegan
*Attorney, Agent, or Firm*—Teagno & Toddy

[57] ABSTRACT

A control valve for a variable displacement pump or motor. The valve includes a pair of solenoids which are independently actuatable to port relatively high pressure fluid to their respective servo motor. A shuttle valve actuated by the high pressure fluid is used to simultaneously port the fluid from the other servo motor to a low pressure fluid source. A manual valving system is also provided having a pair of balls each biased into engagement with a seat to seal a passage to one of the servo motors. Movement of either ball off of its seat allows high pressure to flow to the respective servo motor. The high pressure fluid actuates the shuttle valve to port fluid from the other servo motor to the low pressure fluid source.

6 Claims, 2 Drawing Figures

CONTROL FOR HYDROSTATIC TRANSMISSIONS

FIELD OF THE INVENTION

This invention relates generally to an improved hydrostatic transmission control which is usable to vary the swashplate on either a pump or motor unit.

DESCRIPTION OF THE PRIOR ART

Known control systems for varying the displacement of a hydrostatic transmission are disclosed and claimed in U.S. Pat. No. 3,901,031 entitled Hydrostatic Transmission Control System and U.S. patent application Ser. No. 511,212, filed Oct. 2, 1974 by Kenneth K. Knapp, Charles R. Cornell, and Dennis D. Simpson and entitled Hydrostatic Transmission Control System. These known control systems make use of a movable spool in their preferred embodiments. Although both systems provide for exceptional operation it has been determined that in some applications it is desirable to have a non-spool system. It is believed that by eliminating the spool, the cost of the control system for a hydrostatic transmission can be reduced.

SUMMARY OF THE INVENTION

It is accordingly an object of the invention to provide an economical valve without a spool to control the displacement of a pump or motor unit of a hydrostatic transmission.

According to a feature of the invention the above object is accomplished by providing in a control valve first and second seals respectively operable to port relatively high pressure fluid to one or the other of two motors used to move the swash plate, and a valve operable in response to a differential in pressure to port fluid to a relatively low pressure source from the motor not receiving high pressure fluid. During operation the swashplate will only move as long as one of the first and second seals is actuated. When the first or second seal is released the seal closes off the high pressure fluid source to the respective motor and retains the fluid in the motor so that the swashplate position is fixed. Seals are provided in the valve to prevent fluid leakage from the swashplate motors to the low pressure source.

DESCRIPTION OF THE PREFERRED EMBODIMENT

Figure 1:
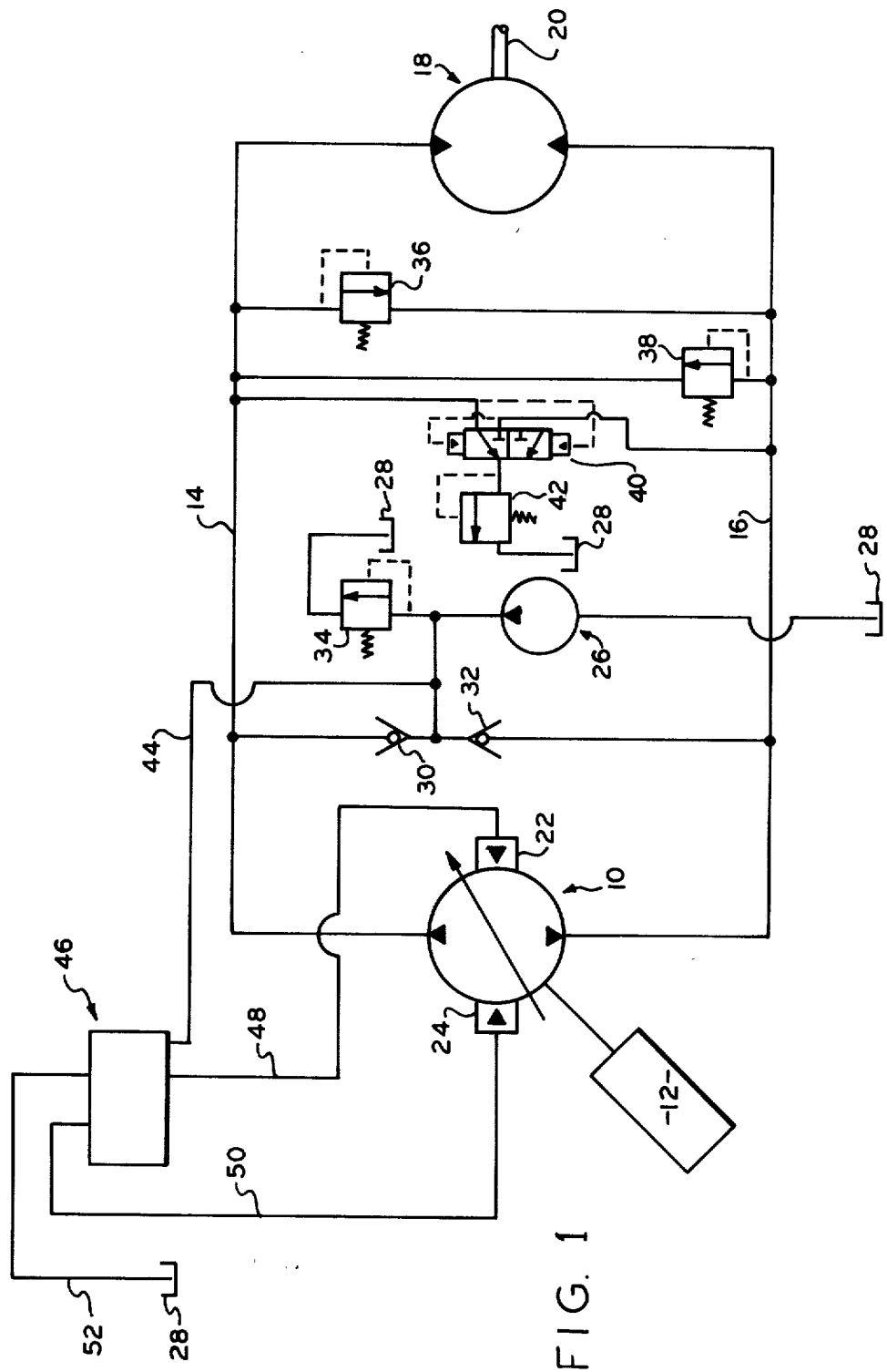
FIG. 1 is a schematic view of a hydrostatic transmission control circuit embodying the invention.

FIG. 1 schematically illustrates a hydraulic circuit including a variable displacement axial piston pump 10 driven by a prime mover 12. Pump 10 is connected by first and second main conduits 14 and 16 to fixed displacement axial piston motor 18 which has an output shaft 20 to provide rotational force. As is well known in the art, displacement of pump 10 may be varied by adjusting servo motors 22 and 24. Depending upon the swash angle and position of the internal components of pump 10, either conduit 14 or 16 will transmit relatively high pressure fluid to the motor while the other conduit transmits relatively low pressure fluid from the motor. A charge pump 26 draws fluid from a reservoir 28 and distributes this fluid under charge pressure via conduits to a pair of oppositely arranged check valves 30 and 32. The check valves open toward the conduits 14 and 16 so that fluid delivered by charge pump 26 flows through the check valve opening into the low pressure conduit and from there into pump 10 to make up fluid lost through system leakage.

A spring biased pressure limiting valve 34 is also connected with the outlet of charge pump 26. Valve 34 discharges into reservoir 28 when the pressure of the fluid from charge pump 26 exceeds a predetermined value.

A pair of high pressure relief valves 36 and 38 are appropriately cross connected across conduits 14 and 16. High pressure relief valve 36 or 38 discharges fluid from the high pressure conduit to the low pressure conduit when the pressure of the fluid within the high pressure conduit exceeds a predetermined value.

A shuttle valve 40 is provided across main conduits 14 and 16 for the purpose of communicating the main conduit having the lowest fluid pressure to a pressure relief valve 42. Pressure relief valve 42 acts to relieve the pressure in the respective main conduit when the pressure of the fluid exceeds a predetermined value. The fluid from the conduit is directed to reservoir 28.

Servo motors 22 and 24 are spring biased in order to maintain the swashplate of variable displacement pump 10 in a centered or neutral position. In order to vary the angle of the swashplate on either side of the neutral position, it is necessary to force fluid under pressure into one of the servo motors while simultaneously porting fluid from the other servo motor to drain. This is accomplished by directing fluid via conduit 44 from charge pump 26 to a control valve 46 and from there through conduit 48 to servo motor 22. Simultaneously the fluid is directed via conduit 50 from servo motor 24 to control valve 46 and from there to reservoir 28 via conduit 52. Reversal of the operation can be accomplished by using valve 46 to direct fluid from servo motor 22 to reservoir 28 via conduit 48, valve 46 and conduit 52 and simultaneously directing fluid from charge pump 26 to servo motor 24 via conduit 44, valve 46, and conduit 50.

The operation of control valve 46 will be hereinafter explained in reference to FIG. 2. With the exception of control valve 46 the remainder of the hydraulic circuit illustrated in FIG. 1 is well known in the hydrostatic transmission art and has been used in that art for many years.

Figure 2:
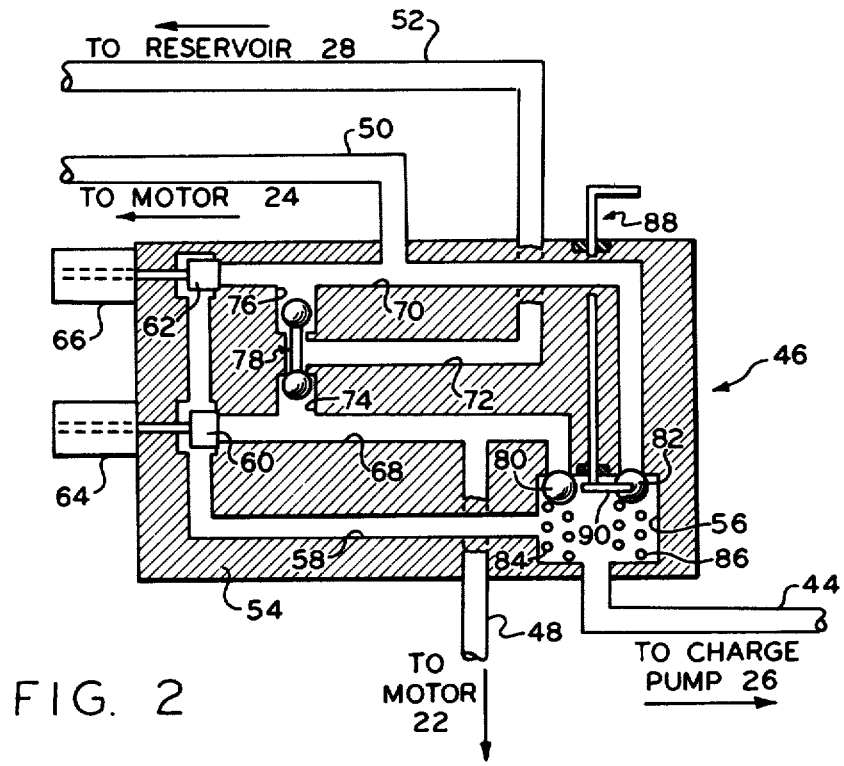
FIG. 2 is a schematic view of a control valve according to the invention.

FIG. 2 schematically illustrates the control valve 46 in adequate detail to be produced by those skilled in the valve art. It is contemplated that various valve designs can be manufactured making use of the concept disclosed.

Control valve 46 includes a body 54 having a chamber 56 located therein. Conduit 44 from charge pump 26 communicates with chamber 56. A passage 58 also communicates with chamber 56 and has a pair of openings enclosed by seals 60 and 62 which are respectively moved by known electrical solenoids 64 and 66. Solenoids 64 and 66 respond to electrical signals from a known control input and are individually operable to move their respective seals to close and open their respective openings from passage 58. Movement of seal 60 provides fluid communication between passage 58 and first passage 68 in body 54. Conduit 48 to motor 22 and chamber 56 are also in fluid communication with first passage 68. Movement of seal 62 from its respective opening provides communication between passage 58 and second passage 70. Conduit 50 to motor 24 and chamber 56 are also in fluid communication with second passage 70.

A third passage 72 is in fluid communication with conduit 52 to reservoir 28 at one end and at the other in fluid communication with passages 74 and 76 which are respectively in fluid communication with first and second passages 68 and 70. A shuttle valve 78 is provided across third passage 72 in passages 74 and 76.

First and second passages 68 and 70 are normally sealed from chamber 56 respectively by balls (seals) 80 and 82 which are biased via springs 84 and 86 into engagement with appropriate seats in valve body 54. Springs 84 and 86 are chosen to have sufficient biasing force to ensure the sealing of the respective ball within its respective seat. A lever 88 in the form of a rod having an arm 90 is located in valve body 54. Appropriate "O" ring seals are provided around lever 88 to prevent leakage of fluid from valve 46. Lever 88 may be rotated 180° in order to have arm 90 contact either ball 80 or 82 to move the respective ball away from its seat and thereby provide communication between chamber 56 and the respective first or second passage. The lever may be either used as the primary means of operation of control valve 46 or a back-up arrangement to electrical solenoids 64 and 66.

Control valve 46 is operable in the following manner. When it is desired to change the displacement of pump 10 an appropriate electrical signal is directed toward either solenoid 64 or 66. It will be assumed that solenoid 64 is actuated. Upon actuation of solenoid 64, seal 60 is removed from its respective opening and fluid from the charge pump 26 is transmitted via conduit 44, chamber 56, passage 58 to first passage 68 and from there to conduit 48 and motor 22. As fluid enters first passage 68 a pressure differential is created on opposite sides of shuttle valve 78 forcing the shuttle valve upwardly in FIG. 2 to seal passage 74 from passage 72 and provide fluid communication between passage 76 and passage 72. The fluid from charge pump 26 will be at a pressure of several hundred psi while the pressure of the fluid in the reservoir will be about 20 psi. The pressure of the fluid acting on motor 22 will have a tendency to force the swashplate of pump 10 in one direction thereby requiring the removal of fluid from motor 24. Since the pressure of the fluid in conduit 48 is greater than the pressure of the fluid in conduit 50, fluid will flow out of motor 24 via conduit 50 to second passage 70 and thence to reservoir 28 via passage 76, third passage 72 and conduit 52. When the swashplate of pump 10 has been moved to the desired position solenoid 64 will be deactivated causing seal 60 to cover the opening from passage 58 to first passage 68 thereby preventing further fluid flow from charge pump 26 to motor 22. Since the pressure of the fluid in motor 22 is greater than that in motor 24 the shuttle valve will remain in its upward position blocking fluid flow from motor 22 to reservoir 28 and thereby maintain the swashplate in the desired position. To reverse the operation of the swashplate it is only needed to direct an electrical signal to solenoid 66 which in turn will cause unsealing of the opening between passage 58 and second passage 70 and reversal of the previously described operation.

It should be appreciated that during operation fluid is not permitted to flow from passage 68 to chamber 56 since the charge pump pressure acts on both sides of ball 80 and the ball is further biased into the closed position by spring 84. Since the pressure of the fluid in chamber 56 is greater than that of the pressure of the fluid in reservoir 28 ball 82 will also remain in the sealed position.

In the event of malfunction of either or both of the solenoids operation of valve 46 may be achieved by movement of lever 88 causing corresponding movement of arm 90 to unseat either ball 80 or 82. Unseating either ball will result in a flow of fluid into the respective passage causing movement of shuttle valve 78 and a direction of the flow of fluid in a manner to that previously described with reference to operation of solenoids 64 or 66. Springs 84 and 86 are chosen to provide adequate biasing force to balls 80 and 82 to maintain the sealing relationship but are not of sufficient strength which would prevent movement of the balls off their seat by rotation of lever 88.

From the foregoing it is obvious that applicant has provided a simple and inexpensive valve to control movement of a swashplate via a pair of hydraulic motors without the use of a spool. The swashplate may be part of either a pump or motor unit. It may readily be seen that the operation of the control valve is achieved by providing only two independently operated seals and a shuttle valve. Operation of either seal will result in both the porting of high pressure fluid to one servo motor and the discharge of low pressure fluid from the other servo motor. Although the system is shown in connection with a charge pump, other fluid sources may also be used.

It should be further noted that by design, the fluid pressure from the relatively high pressure fluid source has a tendency to maintain the sealing engagement of seals 60 and 62 and balls 80 and 82. Further, shuttle valve 78 is arranged to ensure proper sealing to prevent fluid from leaking from the high pressure motor to the reservoir. Control valve 46 may be constructed with manual lever arrangement 88 or solenoids 64 and 66 or may employ both the lever and solenoids as illustrated.

It should be appreciated that in order to maintain proper control of the servo motors 22 and 24 with control valve 46 that the pistons within the servo motors must be sealed. This sealing may be accomplished by making use of a number of axially spaced O rings encircling each servo motor piston and contacting the cylinder of the respective servo motors. In this manner fluid may be prevented from flowing from one side of the respective piston to the other thereby preventing swashplate movement.

What is claimed is:

1. A control valve for a variable displacement pump or motor having an actuator for varying the displacement thereof, the actuator including first and second motors to increase the displacement of the pump or motor when the volume of fluid is increased in the first motor and decreased in the second motor and to decrease the displacement when the volume of fluid is decreased in the first motor and increased in the second motor, the pump or motor being usable in association with a relatively high pressure fluid source and a relatively low pressure fluid source, the control valve comprising:

A. a first passage adapted for communication with the first motor and the high pressure fluid source;

B. first seal means movable between one position to allow fluid to flow through the first passage from the high pressure fluid source to the first motor and another position to prevent fluid from flowing through the first passage from the high pressure fluid source to the first motor;

C. a second passage adapted for communication with the second motor and the high pressure fluid source;

D. second seal means movable between one position to allow fluid to flow through the second passage from the high pressure fluid source to the second motor and another position to prevent fluid from flowing through the second passage from the high pressure fluid source to the second motor; and E. valve means responsive to the operation of either the first or second seal means
  1. to allow fluid to flow between the low pressure fluid source and the second passage when the first seal means is moved to the one position and to simultaneously prevent fluid from flowing from the first passage to the low pressure fluid source, and
  2. to allow fluid to flow between the low pressure fluid source and the first passage when the second seal means is moved to the one position and to simultaneously prevent fluid from flowing from the second passage to the low pressure fluid source.

2. A control valve according to claim 1 wherein:

F. a third passage is provided and adapted for fluid communication with the low pressure fluid source;

G. the valve means comprises a shuttle valve interposed between the first and second passages to allow fluid to flow through the passage having fluid at the lowest pressure to the third passage and to prevent fluid from flowing from the other passage to the third passage.

3. A control valve according to claim 1 wherein:

F. the first seal means includes a seal resiliently biased to prevent fluid from flowing through the first passage from the high pressure fluid source to the first motor;

G. the second seal means includes a seal resiliently biased to prevent fluid from flowing through the second passage from the high pressure fluid source to the second motor; and H. the first and second seal means further includes means to selectively overcome the resilient bias of the seal of the first or the second seal means to move the seal and thereby allow fluid to flow through the respective passage.

4. A control valve according to claim 1 wherein:

F. the first seal means comprises,
  1. a seal interposed between the high pressure fluid source and the first passage, and
  2. a first electrical solenoid operable in response to an electrical signal to move the seal of the first seal means between the one position and the other position; and G. the second seal means comprises,
  1. a seal interposed between the high pressure source and the second passage, and
  2. a second electrical solenoid operable in response to an electrical signal to move the seal of the second seal means between the one position and the other position.

5. A control valve according to claim 4 further comprising:

H. a seat for each seal against which the seal, when located in the other position, prevents fluid from flowing through the respective passage; and wherein I. each seal is positioned intermediate its seat and the high pressure source whereby the high pressure fluid will force the seals toward engagement with their respective seats.

6. A control valve according to claim 4 wherein:

H. a third passage is provided and adapted for fluid communication with the low pressure fluid source;

I. the valve means comprises a shuttle valve interposed between the first and second passages to allow fluid to flow through the passage having fluid at the lowest pressure to the third passage and to prevent fluid from flowing from the other passage to the third passage;

J. a seal is resiliently biased to block fluid flow through the first passage from the high pressure fluid source to the first motor;

K. a seal is resiliently biased to block fluid flow through the second passage from the high pressure fluid source to the second motor; and L. means, independent of the first and second seal means, are provided to selectively overcome the resilient bias of a seal to move the respective seal and thereby allow fluid to flow through the respective passage.

* * * * *